United States Patent
Shida et al.

(10) Patent No.: US 7,680,163 B2
(45) Date of Patent: Mar. 16, 2010

(54) LASER IRRADIATING METHOD INCLUDING MAINTAINING TEMPERATURE OF A LENS

(75) Inventors: Junichi Shida, Kanagawa (JP); Suk-hwan Chung, Kanagawa (JP); Shuichi Uryu, Kanagawa (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 12/232,230

(22) Filed: Sep. 12, 2008

(65) Prior Publication Data
US 2009/0034578 A1 Feb. 5, 2009

Related U.S. Application Data

(62) Division of application No. 11/662,971, filed as application No. PCT/JP2006/311069 on Jun. 2, 2006, now Pat. No. 7,471,712.

(30) Foreign Application Priority Data
Jun. 13, 2005 (JP) ............... 2005-172329

(51) Int. Cl.
*H01S 3/04* (2006.01)
*H01S 3/08* (2006.01)
*B23K 26/06* (2006.01)
*G02B 7/02* (2006.01)

(52) U.S. Cl. ............ 372/34; 372/107; 359/820; 219/121.75

(58) Field of Classification Search ............ 219/121.75; 372/107, 34; 359/820
See application file for complete search history.

(56) References Cited

U.S. PATENT DOCUMENTS 6,353,203 B1  3/2002  Hokodate et al.

FOREIGN PATENT DOCUMENTS

JP  60-247488  12/1985

(Continued)

OTHER PUBLICATIONS

Supplementary European Search Report (in English language) issued Jun. 30, 2009 in European Patent Application No. 06 75 6907.

*Primary Examiner*—Minsun Harvey
*Assistant Examiner*—Marcia A. Golub
(74) *Attorney, Agent, or Firm*—Wenderoth, Lind & Ponack, L.L.P.

(57) ABSTRACT

A first mirror (5) that can be located at a reflection position (I) at which an optical path is blocked and a laser beam (a) is reflected, and a second mirror (6) that reflects the laser beam (a) which is reflected by the first mirror (5) are disposed between the condenser lens (2) and the object to be irradiated (4). The first mirror (5) is located at the reflection position (I) so that the laser beam (a) that is transmitted through the condenser lens (2) is sequentially reflected by the first and second mirrors (5 and 6), and an intensity of the laser beam (a) that is again reflected by the first mirror (5) is made to coincide with an intensity of the laser beam (a) that is reflected from the object to be irradiated (4), and the condenser lens (2) is heated in the same manner that the processing laser beam (a) is transmitted through the condenser lens (2) and irradiated on the object to be irradiated (4).

4 Claims, 3 Drawing Sheets

FOREIGN PATENT DOCUMENTS

| | | |
|---|---|---|
| JP | 04-167990 | 6/1992 |
| JP | 11-037895 | 2/1999 |
| JP | 2000-94173 | 4/2000 |
| WO | 2004/038775 | 5/2004 |

LASER IRRADIATING METHOD INCLUDING MAINTAINING TEMPERATURE OF A LENS

This is a divisional application of Ser. No. 11/662,971 filed Mar. 16, 2007, now U.S. Pat. No. 7,471,712, which is the National Stage of International Application No. PCT/JP2006/311069, filed Jun. 2, 2006.

BACKGROUND OF THE INVENTION

1. Technical Field

The present invention relates to a laser irradiating method and a device for the method, and more particularly, to a laser irradiating method of condensing or focusing a laser beam from a laser oscillator through a lens, and irradiating an object to be irradiated which is mounted on a stage with the laser beam to reform the object to be irradiated, and a device for the method, which have a mirror for maintaining a temperature of the lens and also a focal distance.

2. Description of the Related Art

Up to now, in manufacture of crystallized silicon of a thin film transistor, an object to be irradiated having a thin a-Si (amorphous silicon) film formed on a glass substrate is irradiated with a laser beam, and the a-Si film is crystallized to provide a p-Si (polysilicon) film. As one of methods of irradiating the a-Si film with a laser beam to reform the a-Si film, there is a method in which a laser beam having a uniform intensity is applied to a mask, and the laser beam is then projected and focused on the a-Si film of the object to be irradiated by means of a condenser lens of an optical device. Thus, the object is irradiated with the laser beam (see for example, JP 3204986 B).

In the method, a laser beam that is produced by a laser oscillator that generates an excimer laser beam is introduced into the optical device, and appropriately diverted by means of a reflective mirror, and the intensity of the laser beam is equalized. After that, the laser beam is allowed to pass through the mask and the condenser lens so as to be shaped in a square line beam (pulse laser beam), and then condensed and transferred to the object to be irradiated. The object to be irradiated is located within a vacuum chamber of a laser beam anneal device.

SUMMARY OF THE INVENTION

1. Problem to be Solved by the Invention

However, the conventional laser irradiating device as described above suffers from a technical problem in that a focal distance of the lens fluctuates due to a change in temperature. That is, because the pulse laser beam that is produced by the laser oscillator is allowed to pass through the condenser lens, and then irradiated to the object to be irradiated, a part of laser beam is absorbed by the lens and transformed into heat to increase the temperature of the lens when the laser beam passes through the condenser lens. The temperature of the lens is generally maintained at a given temperature to prevent a change in focal distance. When irradiation is restarted after the successive irradiation of the pulse laser beam stops, a long time is required to restore the temperature of the lens which has been cooled once to a given temperature, which causes deterioration of the operating efficiency.

In order to prevent a change in the focal distance that is attributable to the change in the temperature, the condenser lens is housed in a lens tube, the condenser lens is indirectly heat-insulated by the aid of a temperature control device that is attached to the lens tube, and the temperature of the lens is maintained at a given temperature. In this case, the lens is mainly directly heated by the laser beam to increase the temperature. On the other hand, the temperature control of the lens is indirectly conducted from the side surface. For this reason, a time constant of the temperature rise of the lens by the laser beam is shorter than the time constant of cooling by the temperature control device. Therefore, when the laser beam irradiation is restarted after the successive irradiation of the pulse laser beam has been stopped, the lens temperature rises in a short period of time, then drops, and is thereafter stabilized. Because the focal distance of the lens continues to change until the temperature has been stabilized, the object to be irradiated is irradiated with the laser beam out of focus.

Also, in order to suppress a change in the focal distance which is attributable to the change in the temperature of the condenser lens, an attempt is made to combine lenses made of a plurality of materials that are different in temperature characteristic with respect to each other. However, the suppression effect is insufficient.

2. Means for Solving the Problem

The present invention has been made in view of the above-mentioned conventional technical problems, and a configuration of the present invention will be described below.

The present invention provides a laser irradiating method of condensing or focusing a processing laser beam from a laser oscillator through a lens, and irradiating an object to be irradiated with the processing laser beam, in which a first mirror that can be located at a reflection position at which an optical path between the lens and the object to be irradiated is blocked and the processing laser beam with a given reflectivity is reflected and at an open position at which the optical path between the lens and the object to be irradiated is opened is arranged between the lens and the object to be irradiated, and a second mirror that reflects the processing laser beam with a given reflectivity is arranged perpendicularly to an optical axis of the processing laser beam which is reflected by the first mirror located at the reflection position, and the first mirror is located at the reflection position so that the processing laser beam that is transmitted through the lens is sequentially reflected by the first mirror and the second mirror, and an intensity of the processing laser beam that is again reflected by the first mirror is made to coincide with an intensity of the processing laser beam that is reflected from the object to be irradiated in a state where the first mirror is located at the open position, and the lens is heated in the same manner that the processing laser beam is transmitted through the lens, and irradiated on the object to be irradiated.

The present invention also provides a laser irradiating device for condensing or focusing a processing laser beam from a laser oscillator through a lens, and irradiating an object to be irradiated with the processing laser beam, in which a first mirror that can be located at a reflection position at which an optical path between the lens and the object to be irradiated is blocked and the processing laser beam with a given reflectivity is reflected and at an open position at which the optical path between the lens and the object to be irradiated is opened is arranged between the lens and the object to be irradiated, and a second mirror that reflects the processing laser beam with a given reflectivity is arranged perpendicularly to an optical axis of the processing laser beam which is reflected by the first mirror located at the reflection position, and the first mirror is located at the reflection position so that the processing laser beam that is transmitted through the lens is sequentially reflected by the first mirror and the second mirror, and an intensity of the processing laser beam that is again reflected by the first mirror is made to coincide with an intensity of the processing laser beam that is reflected from the object to be irradiated in a state where the first mirror is located at the open position, and the lens is heated in the same manner that the processing laser beam is transmitted through the lens and irradiated on the object to be irradiated.

The present invention also provides that the first mirror is made of a total reflection mirror, the second mirror is made of a half mirror having the same reflectivity as the reflectivity of the object to be irradiated, and the second mirror is located at a position apart from the first mirror by a distance that is equal to a distance between the first mirror and the object to be irradiated.

Further, the lens includes measuring means for measuring the focal distance. The lens is attached with a temperature control device.

3. Effect of the Invention

The temperature of the lens is stabilized without irradiating the object to be irradiated with a processing laser beam, so the focal distance of the lens can be prevented from changing due to the change in the temperature, thereby making it possible to always keep the quality of the laser beam with which the object to be irradiated is irradiated constant. As a result, the defocused laser beam is prevented from being applied to the object to be irradiated in an initial stage of starting the irradiation of the object to be irradiated with the processing laser beam, and only the object to be irradiated with a high quality can be manufactured without any waste of the object to be irradiated.

More particularly, a first mirror is located at a reflection position since the processing of one object to be irradiated has been completed until a subsequent object to be irradiated is set, thereby making it possible to keep the temperature of the lens and the focal distance constant.

The intensity of the processing laser beam, which is again reflected by the first mirror, is made to coincide with the intensity of the processing laser beam which is reflected from the object to be irradiated in a state where the first mirror is located at the open position. As a result, it is possible to readily realize that the lens is heated similarly when the object to be irradiated is irradiated with the processing laser beam through the lens.

A measuring means is provided for measuring the local distance of the lens, so it is possible to measure whether the temperature of the lens is in a desired state or not.

DETAILED DESCRIPTION OF THE INVENTION

An object of the present invention is to provide a laser irradiating method of condensing or focusing a laser beam and irradiating an object to be irradiated with the laser beam which is located on a stage through a lens to reform the object to be irradiated and a device for the method, which includes a mirror for maintaining the temperature of a lens as well as a focal distance, keeping the quality of the laser beam constant, and manufacturing only an object to be irradiated with a high quality.

Figure 1:
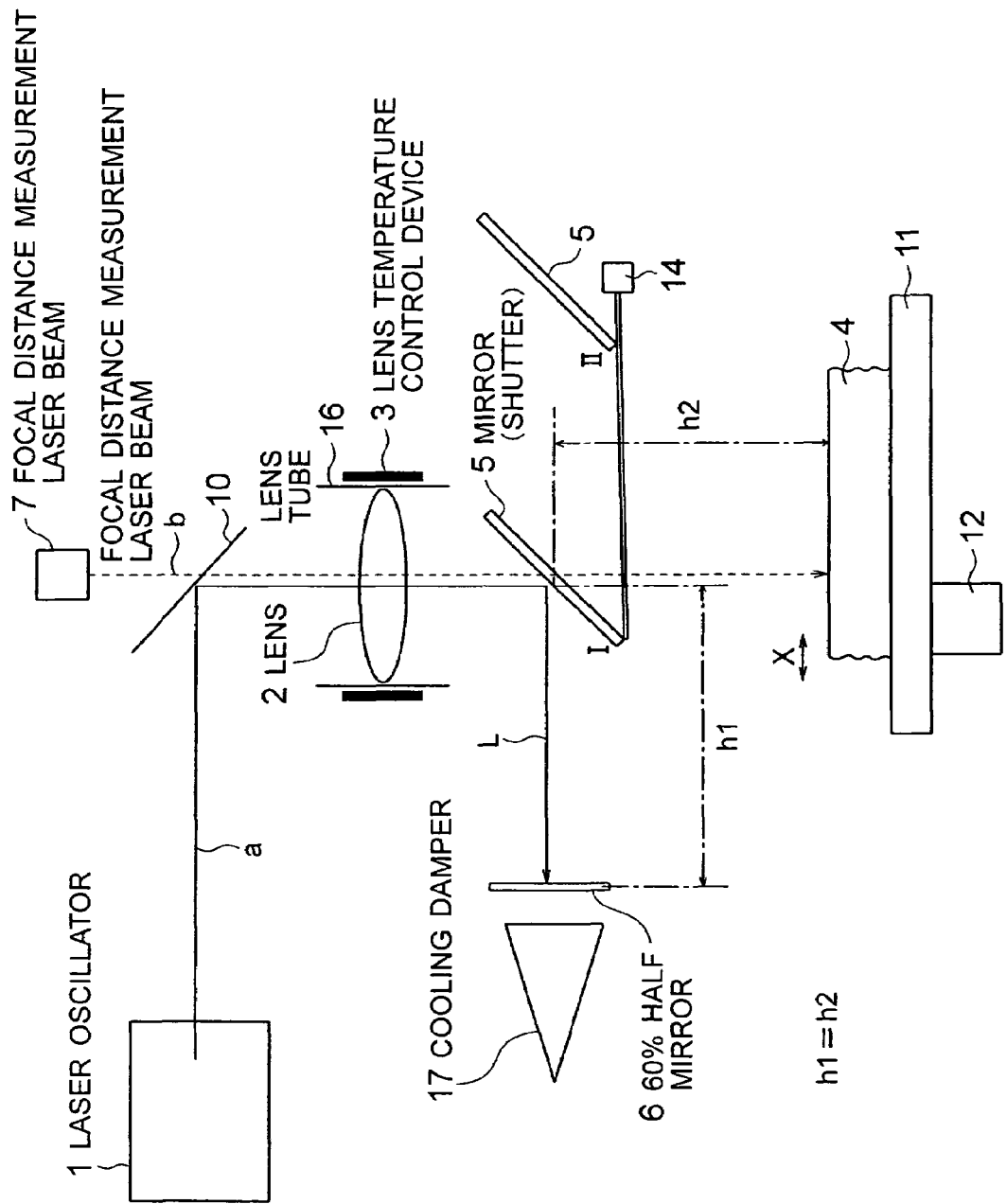
FIG. 1 is a front view showing a laser irradiating device according to one embodiment of the present invention.
Figure 2:
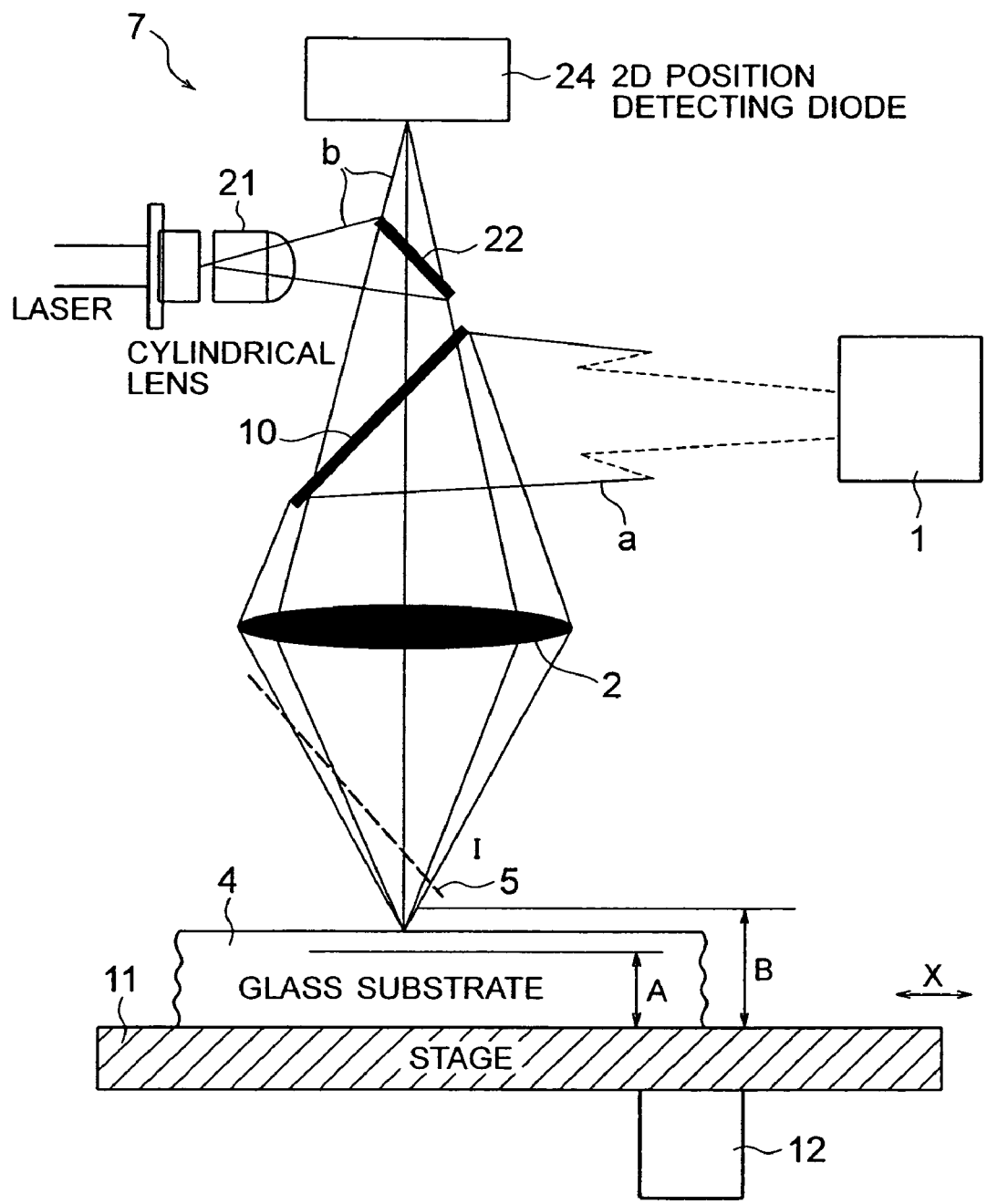
FIG. 2 is a back view specifically showing measuring means that is equipped in the laser irradiating device.

FIGS. 1 to 3 show a laser irradiating device having a mirror for maintaining a focal distance of a condenser lens (lens) according to one embodiment of the present invention. Referring to FIG. 1, reference numeral 1 denotes a laser oscillator, and a processing pulse laser beam a (wavelength: for example, 308 nm) from the laser oscillator 1 is shifted by 90 degrees by a mirror 10 that totally reflects the processing laser beam a, which is guided to a condenser lens 2. The laser beam that has passed through the condenser lens 2 is condensed (or focused) and irradiated onto an object to be irradiated 4 to subject the object to be irradiated 4 to crystallization. The laser beam a is actually allowed to pass through a mask (not shown) or the like so as to be converted into a square laser beam that is shaped and equalized in intensity, and then focused on the object to be irradiated 4. The condenser lens 2 is received in a lens tube 16, and is indirectly cooled or heated by a temperature control device 3 that is made of a Peltier device attached to the outer side of the mirror tube 16 so as to maintain a given temperature of the lens.

The object to be irradiated 4 is mounted on a stage 11, and a moving device 12 is attached to the stage 11. The moving device 12 is caused to relatively move the stage 11 with respect to the laser oscillator 1 in a given direction X. With this configuration, the object to be irradiated 4 which is mounted on the stage 11 is irradiated with the laser beam a at given intervals to reform the object to be irradiated 4.

A first mirror 5 (reflective mirror), which reflects the processing laser beam with a given reflectivity, can be arranged between the condenser lens 2 and the object to be irradiated 4. The mirror 5 is capable of blocking an optical path between the condenser lens 2 and the object to be irradiated 4. The mirror 5 is driven by a drive device 14 so as to be located at a reflection position I (indicated by a solid line) which blocks the optical path between the condenser lens 2 and the object to be irradiated 4, and an open position II (indicated by a virtual line) which opens the optical path between the condenser lens 2 and the object to be irradiated 4. The mirror 5 is normally made of a total reflection mirror. In this case, the mirror 5 is located at the reflection position I so as to function as an optical shutter that blocks the processing laser beam a which is directed toward the stage 11. Even when the optical path is closed by the optical shutter, the processing laser beam a passes through the condenser lens 2.

Also, a second mirror 6 that reflects the processing laser beam a with a given reflectivity is arranged. The mirror 6 is disposed perpendicularly to an optical axis L of the processing laser beam a that is reflected by the first mirror 5 which is located at the reflection position I. A distance h1 of the mirror 6 from the first mirror 5 is set to be equal to a distance h2 between the first mirror 5 and the object to be irradiated 4. The second mirror 6 is normally made of a half mirror, and has a reflectivity (about 60%) identical with the reflectivity of the object to be irradiated 4. The second mirror 6 is attached to a damper 17 that absorbs the transmitted processing laser beam a.

In addition, the laser irradiating device further includes measuring means 7 for measuring a focal distance of the condenser lens 2. In the measuring means 7, more specifically, as shown in FIG. 2, after a focal distance measurement laser beam b (wavelength: for example, 635 nm) is allowed to pass through a cylindrical lens 21, the focal distance measurement laser beam b is reflected by a reflection mirror 22 which is made of a half mirror so as to be diverted. Also, the focal distance measurement laser beam b is allowed to pass through a mirror 10, condensed through the condenser lens 2, and allowed to pass through the first mirror 5 so as to be irradiated onto the surface of the object to be irradiated 4. The reflected light from the object to be irradiated 4 is allowed to sequentially pass through the first mirror 5, the condenser lens 2, and the mirrors 10 and 22, and is then received by a measuring device 24. Accordingly, the mirror 10 and the first mirror 5 are capable of totally reflecting the processing laser beam a, but transmit the focal distance measurement laser beam b.

Figure 3E:
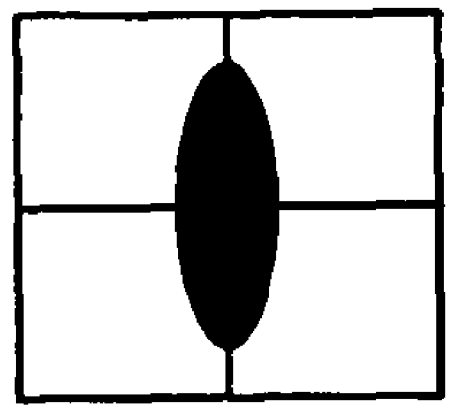
FIGS. 3E to 3G are diagrams each showing a waveform of a laser beam for focal distance measurement which is received by a measuring equipment, respectively.
Figure 3F:
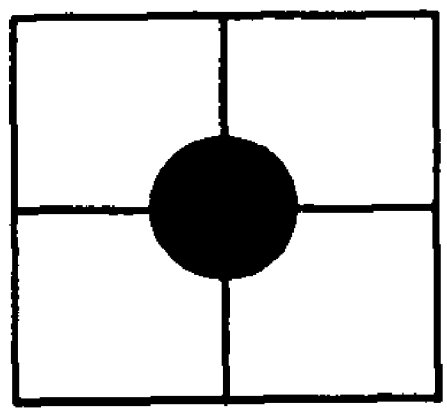
Figure 3G:
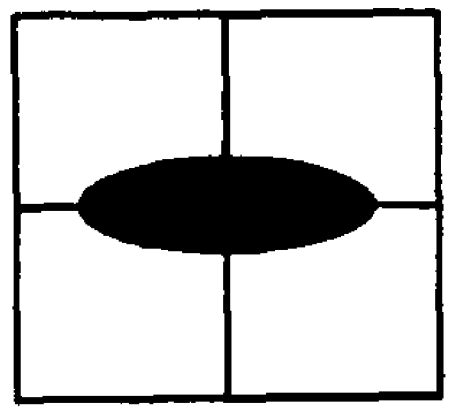

It can be determined whether a distance on the optical path between the condenser lens 2 and the object to be irradiated 4 as well as the focal distance of the condenser lens 2 is adequate or not, on the basis of the configuration of the beam b that has been received by the measuring device 24. The focal distance of the condenser lens 2 is measured as a difference B-A of the distance on the optical axis between the condenser lens 2 and the object to be measured 4. The configuration of the beam that is received by the measuring device 24 is shown in FIGS. 3(E) to 3(G). FIG. 3(E) shows a too long focal distance of the condenser lens 2, FIG. 3(F) shows an appropriate state, and FIG. 3(G) shows a too short focal distance of the condenser lens 2.

Now, the operation will be described.

The processing pulse laser beam a from the laser oscillator 1 is diverted by 90 degrees by means of the total reflection mirror 10, and guided to the condenser lens 2. The laser beam a that is transmitted through the condenser lens 2 is condensed and irradiated onto the object to be irradiated 4 to reform the object to be irradiated 4. When the object to be irradiated 4 has a thin a-Si film formed on a glass substrate, the a-Si film is crystallized by irradiation of the laser beam a to be reformed to be a thin p-Si film. In this situation, the first mirror 5 is located at the open position II at which the optical path between the condenser lens 2 and the object to be irradiated 4 is open.

Upon completion of the irradiation processing of the laser beam a with respect to the single object to be irradiated 4, the object to be irradiated 4 on the stage 11 is replaced with a new object to be irradiated 4. In this situation, the first mirror 5 (reflection mirror) is driven by the drive device 14 so as to be located at the reflection position I that blocks the optical path between the condenser lens 2 and the object to be irradiated 4 and reflects the processing laser beam a with a given reflectivity.

With this configuration, the processing pulse laser beam a that is transmitted through the condenser lens 2 is reflected by the first mirror 5 that is located at the reflection position I, and made perpendicularly incident on and partially reflected by the second mirror 6. The processing pulse laser beam a is reflected by the first mirror 5 again, and is transmitted through the condenser lens 2. Accordingly, the intensity of the laser beam a that is reflected by the first mirror 5 toward the condenser lens 2 is made to coincide with the intensity of the laser beam a that is reflected from the object to be irradiated 4. This heats the condenser lens 2 as in the case where the object to be irradiated 4 is irradiated with the laser beam a, and prevents a variation in the focal distance which is attributable to the cooling of the condenser lens 2. It is desirable that the processing laser beam a that is transmitted through the first mirror 5 does not influence the reformation processing of the object to be irradiated 4.

In particular, when the first mirror 5 is configured by a total reflection mirror, the second mirror 6 is located at a position that is apart from the laser beam a by the distance h1 that is equal to the distance h2 between the first mirror 5 and the object to be irradiated 4. Also, the reflectivity of the second mirror 6 is made equal to the reflectivity of the object to be irradiated 4, thereby making it possible that the intensity of the laser beam a which is reflected from the first mirror 5 toward the condenser lens 2 readily coincides with the intensity of the pulse laser beam a that is reflected from the object to be irradiated 4.

The first mirror 5 may not necessarily be located at the reflection position I only in a case of replacing the object to be irradiated 4. The case where the first mirror 5 is located at the reflection position I widely includes a case in which there is the necessity of maintaining the temperature of the condenser lens 2 when the object to be irradiated 4 has been removed from the stage 11.

Also, as in the case where the processing laser beam a is guided to the object to be irradiated 4, in order to receive the condenser lens 2 in the mirror tube 16, the condenser lens 2 is cooled by the temperature control device 3 that is attached to the mirror tube 16, so as to maintain a given temperature of the lens 2. The lens 2 is directly heated by the laser beam a to increase the lens temperature whereas the temperature control of the lens 2 is indirectly conducted from the side surface thereof. The temperature control device 3 can be omitted, and in the case where the temperature control device 3 is omitted, the irradiation of the object to be irradiated 4 with the processing laser beam a can be started in a state where the condenser lens 2 is heated by the processing laser beam a and the temperature rise then stops.

The measuring means 7 for measuring the focal distance of the condenser lens 2 irradiates the surface of the object to be irradiated 4 with the focal distance measurement laser beam b, allows the reflected light b from the surface to pass through the condenser lens 2 and the mirrors 5, 10, and 22, and allows the focal distance measurement laser beam b to be received by the measuring unit 24. As a result, it is possible to know that the focal distance of the condenser lens 2 is in an appropriate state on the basis of the configuration of the laser beam b that has been received by the measuring device 24. It is possible to know that the temperature of the condenser lens 2 is appropriate on the basis of the fact that the focal distance of the condenser lens 2 is appropriate.

A laser oscillator LS2000 made of Lambda Physik Co., Ltd. is used as the laser oscillator 1 to actually oscillate the processing laser beam a (308 nm in wavelength, 300 Hz in repetitive oscillation), and the first mirror 5 resulting from depositing a dielectric multi-layer film that totally reflects the laser beam a on quartz is located between the condenser lens 2 and the object to be irradiated 4 with an inclination of 45 degrees with respect to the optical axis. The first mirror 5 is capable of transmitting a diode laser beam having a wavelength of 635 nm which is the focal distance measurement laser beam b.

The second mirror 6 that is formed of a half mirror is located at the distance h1 which is equal to the distance h2 between the first mirror 5 and the object to be irradiated 4 in the travel direction of the processing laser beam a which is reflected by the first mirror 5. The second mirror 6 is located perpendicularly to the optical axis L that is bent 90 degrees by the first mirror 5.

The second mirror 6 has a reflectivity of 60% with respect to the light (processing laser beam a) that is 308 nm in wavelength, which is made equal to the reflectivity of the substrate obtained by depositing amorphous silicon having a thickness of 50 nm which is the object to be irradiated 4 on a glass plate that is 0.5 mm in thickness with respect to the beam a of 308 nm in wavelength.

Also, the laser irradiating device also includes the measuring means 7 that irradiates the object to be irradiated 4 with the beam that is 635 nm in wavelength (focal distance measurement laser beam b) beyond the mirror 5, and measures the focal distance of the condenser lens 2 with the aid of the reflected beam b.

The Peltier device (temperature control device 3) is located outside of the mirror tube 16 of the condenser lens 2 to control the temperature of the lens 2.

With the laser irradiating device as described above, it is confirmed that the temperature of the condenser lens 2 can be kept substantially constant by the first and second mirrors 5 and 6.

The invention claimed is:

1. A laser irradiating method comprising:

emitting a laser beam from a laser oscillator;

guiding the laser beam to a condenser lens;

positioning a first mirror between the condenser lens and an object to be irradiated, wherein the first mirror is movable between a reflection position (I) at which an optical path between the condenser lens and the object to be irradiated is blocked, and at an open position (II) at which the optical path between the lens and the object to be irradiated is open;

positioning a second mirror so as to be arranged perpendicularly to an optical axis of the processing laser beam that is reflected by the first mirror when located at the reflection position (I), the second mirror reflecting the processing laser beam with a given reflectivity;

moving the first mirror to the open position (II) and irradiating the object with the processing laser beam transmitted through the condenser lens; and moving the first mirror to the reflection position (I) to block the optical path between the condenser lens and the object, wherein the first mirror reflects the processing laser beam with a given reflectivity to the second mirror, which partially reflects the processing laser beam so that the processing laser beam is again reflected by the first mirror and is transmitted through the condenser lens, thereby heating the condenser lens in the same manner as when the first mirror is located at the open position (II) and the processing laser beam is transmitted through the condenser lens and irradiated on the object.

2. The laser irradiating method as claimed in claim 1, wherein the intensity of the processing laser beam that is reflected by the first mirror toward the condenser lens coincides with the intensity of the processing laser beam reflected from the object during irradiation thereof.

3. The laser irradiating method as claimed in claim 1, wherein the reflectivity of the second mirror is equal to the reflectivity of the object to be irradiated.

4. The laser irradiating method as claimed in claim 1, wherein the second mirror is positioned a distance from the processing laser beam transmitted through the condenser lens, wherein the distance is equal to a distance between the first mirror and the object to be irradiated.

* * * * *